United States Patent [19]
Oetiker

[11] 3,789,463
[45] Feb. 5, 1974

[54] BRIDGING MEMBER FOR HOSE CLAMPS

[76] Inventor: Hans Oetiker, 21, Oberdorfstrasse, Horgen, Switzerland

[22] Filed: Nov. 19, 1971

[21] Appl. No.: 200,384

[52] U.S. Cl............................................. 24/20 CW
[51] Int. Cl............................................... B65d 63/02
[58] Field of Search...... 138/99; 285/365, 366, 367, 285/410, 411; 24/279, 280, 281, 282, 284, 20 CW, 71 J

[56] References Cited
UNITED STATES PATENTS

| | | | |
|---|---|---|---|
| 492,165 | 2/1893 | Nase...................................... | 24/279 |
| 1,821,507 | 9/1931 | Gammell et al...................... | 24/71 J |
| 3,275,366 | 9/1966 | Hidding.................... | 24/20 CW UX |
| 3,523,337 | 8/1970 | Oetiker............................. | 24/20 CW |

FOREIGN PATENTS OR APPLICATIONS

| | | | |
|---|---|---|---|
| 783,296 | 4/1968 | Canada............................ | 24/20 CW |

*Primary Examiner*—Donald A. Griffin
*Attorney, Agent, or Firm*—Craig and Antonelli

[57] ABSTRACT

A bridging member for bridging the gap formed in the circumferential band portion of a hose clamp provided with an outwardly extending fold adapted to be contracted, whereby the bridging member consists of relatively thin material and includes a base portion adapted to abut against the radially inner surface of the band and side walls extending substantially at right angle to the base portion and provided with inwardly directed projections near the outer ends which can snap-in behind the outer surface of the band and thereby hold the bridging member in the assembled condition.

21 Claims, 9 Drawing Figures

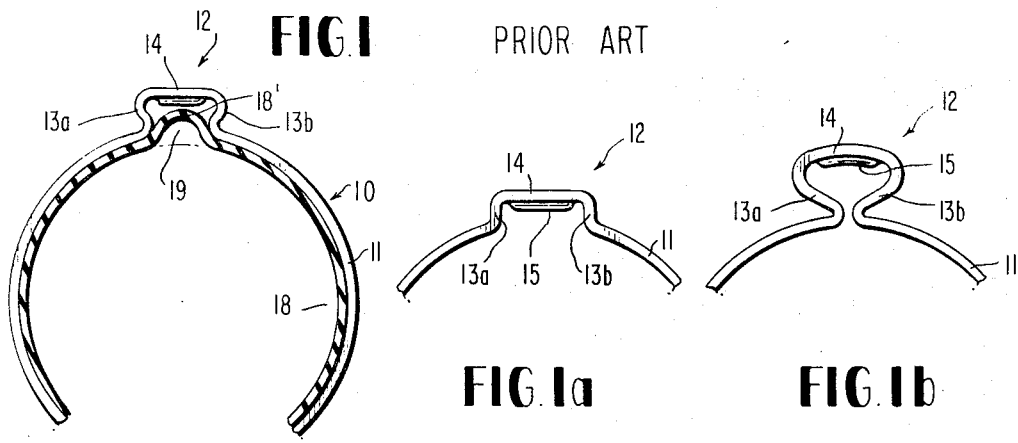
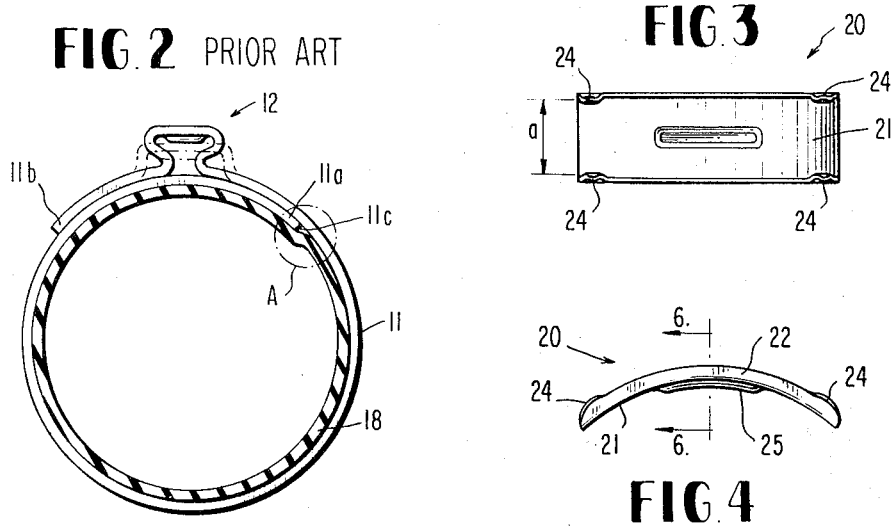
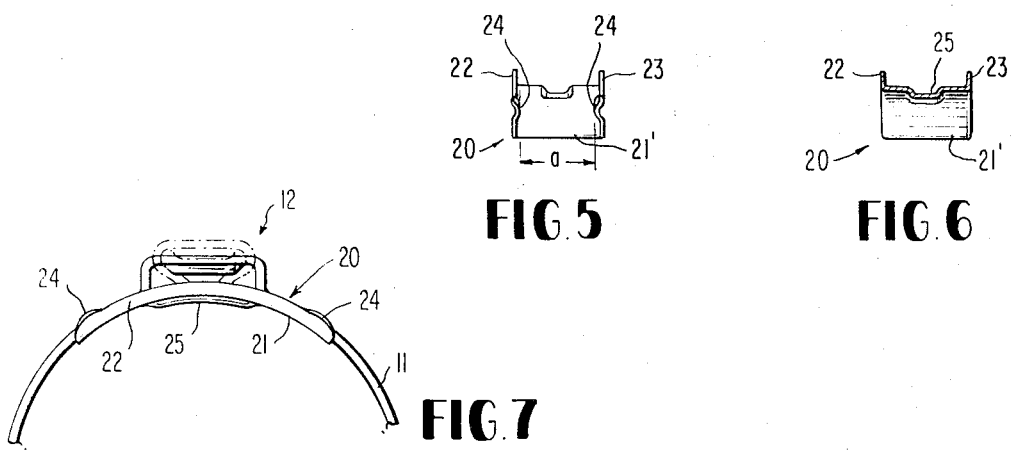

BRIDGING MEMBER FOR HOSE CLAMPS

The present invention relates to hose clamps and more particularly to bridging members for hose clamps.

In my prior U.S. Pat. No. 3,082, 498 a hose clamp is described which consists of a compression band provided with an outward ear-shaped fold or lug having a substantially U-shaped configuration, as viewed in the axial direction, in the uncontracted condition of the band, which assumes a shape approximating the Greek letter omega when the fold or lug is contracted. The type of hose clamps as disclosed in this patent have proved highly successful in numerous applications. However, when used in particular with thin hoses, problems arise in achieving a clamp which holds tight under all conditions due to the fact that the thin hose is squeezed out into the area between the ends of the band where they pass over into the fold.

In my prior U.S. Pat. No. 3, 2686, 314, a hose clamp is described in which one free end of the band overlaps the ear-shaped fold or lug, formed near the other, outer end of the band. However, in particular with thin hoses, this arrangement has proved disadvantageous because the thin-walled hose is damaged and eventually rendered defective due to the wear at the edge of the free end of the overlapping band portion. Furthermore, the band material used for hose clamps as described in these patents is relatively expensive due to the qualities and properties required thereof as regards strength, corrosion-resistance, etc., so that the additional material required for the overlapping band portion increases the cost of the clamp.

Accordingly, it is an object of the present invention to provide a hose clamp which eliminates the aforementioned shortcomings and drawbacks.

Another object of the present invention resides in a bridging member which effectively avoids the shortcomings encountered in the prior art constructions when used with thin-walled hoses.

A further object of the present invention resides in a bridging member adapted to be used with a hose clamp of the type described above which is simple in construction, inexpensive in manufacture and easy to install, and which can be made from relatively less expensive material than the clamp itself.

Still a further object of the present invention resides in a bridging member for hose clamps of the type described above which can be used with a large number of different sizes of clamps, thereby eliminating the need for stocking large numbers of different sizes of the bridging members.

The present invention essentially consists in a bridging member formed of relatively thin band-steel or the like having a base portion that is rectilinear in the axial direction of the clamp and curved in a plane perpendicular to this axial direction to approximately conform to the curvature of the hose clamp; the base body is adjoined on both sides thereof by side wall portions extending approximately at right angle to the base surface which, in turn, are provided near the respective ends with small inwardly projecting lugs spaced from one another at a distance slightly smaller than the width of the base portion and thus of the band to permit the bridging member to be snapped into position across the gap formed by the uncontracted fold. The base portion may also be provided with a circumferentially extending indentation or embossment to add strength thereto in order to permit use of as thin as possible a band-steel material or the like for the bridging member and thereby to further reduce its costs.

These and further objects, features and advantages of the present invention will become more apparent from the following description when taken in connection with the accompanying drawing which shows, for purposes of illustration only, one embodiment in accordance with the present invention, and wherein FIG. 1 is a cross-sectional view, in a plane perpendicular to the axis, of a prior art clamp in the contracted condition when used with a thin-walled hose;

FIG. 1a is a partial elevational view showing the fold of FIG. 1 in the uncontracted condition;

FIG. 1b is a partial elevational view showing the desired configuration of the fold in the contracted condition;

FIG. 2 is a cross-sectional view through another prior art hose clamp when used with a thin-walled hose;

FIG. 3 is a top plan view of the bridging member in accordance with the present invention;

FIG. 4 is a front elevational view of the bridging member of FIG. 3;

FIG. 5 is a side elevational view of the bridging member illustrated in FIG. 4;

FIG. 6 is a cross sectional view taken along line 6—6 of FIG. 4, and

FIG. 7 illustrates a hose with a bridging member of the present invention installed thereon for use with a thin-walled hose.

Referring now to the drawing wherein like reference numerals are used throughout the various views to designate like parts, and more particularly to FIG. 1, reference numeral 10 generally designates therein a prior art hose clamp as disclosed, for example, in FIGS. 1 and 2 of my prior U.S. Pat. No. 3, 082, 498 or in FIG. 2 of my prior U.S. Pat. No. 3, 286, 314. The hose clamp 10 consists of an annular band 11 which in the uncontracted condition (FIG. 1a) includes a fold or ear generally designated by reference numeral 12 and of substantially rectangular configuration. The ear-shaped fold or lug 12 consists of radially outwardly extending leg portions 13a and 13b joined by a web portion 14. A circumferentially extending groove 15, as disclosed in my U.S. Pat. No. 3, 475, 793 may be provided advantageously in the web portion 14. When contracted in the absence of a hose, the fold or lug 12 approximates an omega shape as shown in FIG. 1b. However, when a thin-walled hose is used, as shown in FIG. 1 and designated therein by reference numeral 18, the thin-walled hose will squeeze into the opening between the two leg portions 13a and 13b as indicated by the bulging out portion 18', which entails certain disadvantages. On the one hand, a contraction of the fold cannot be carried out to the desired extent due to the presence of the material of the bulging hose portion 18' so that the diameter of the band 11 cannot be reduced to the extent possible as shown in FIG. 1b and the clamping force therefor does not attain the desired maximum clamping force otherwise possible. Additionally, the bulged-out portion 18' leaves open the area 19 which may lead to leaks, i.e., non-tightness of the clamp. Additionally, the thin-walled hose will also be subject to wear due to the squeezing action on the bulged-out portion 18', e.g., caused by alternate pressure increases and decreases, which may lead to damages and eventual breaks in a thin-walled hose.

FIG. 2 illustrates the arrangement according to my prior U.S. Pat. No. 3,286,314 in which an overlap exists in the area of the ear-shaped fold 12 between the inner end 11a of the compression band 11 and the outer end 11b containing the contractible fold. While this construction precludes the hose 18 from squeezing out through the gap between the ends of the fold, as in FIG. 1, experiments have indicated that this arrangement is undesirable, in particular for thin-walled hoses, by reason of the existence of the sharp edge 11c at the free end of the inner band portion 11a, which leads to rapid wear at the location of the hose encircled in dash and dot lines in FIG. 2 and designated by reference character A. Additonally, the band material of the band 11 is relatively thick so that the overlapping end 11a thereof not only reduces the existing area on the inside of the hose clamp but also causes some non-circular configuration in the clamp and in the hose which seeks to adapt itself to the configuration of the clamp when in the contracted condition. Moreover, extra material is required to provide the overlapping ends in the embodiment of FIG. 2 which increases the cost of the clamp, particularly when using hardened steel or stainless steel materials.

To avoid these shortcomings, the present invention proposes a bridging member as illustrated in FIGS. 3, 4 and 5 and generally designated therein by reference numeral 20. The bridging member which can be made from a material having a considerably smaller thickness than the band material includes a main base portion 21 arched or curved approximately corresponding to the curvature of the hose clamp, as shown more particularly in FIG. 4 and having a base width corresponding to the width of the band material of the hose. Additionally, the base portion 21 is substantially rectilinear as viewed in the axial direction, as indicated for example, by the edge portion 21'. The base portion 21 is adjoined on both sides by upwardly extending side wall portions 22 and 23 extending from the base surface 21 at approximately right angle. Each side wall portion 22 and 23 is provided with two small inwardly projecting lugs 24 near each respective outer end whereby the distance a (FIGS. 3 and 5) is slightly smaller than the width of the band material of the clamp so that the bridging member 20 can be installed and held fast onto the clamp by the resulting snap-in connection. To reinforce the base surface 21, the latter may be provided with a circumferential groove or indentation 25.

FIG. 7 illustrates the bridging member 24 as installed on the hose clamp of FIG. 1.

The present invention entails certain advantages, particularly when used with relative thin-walled hoses. First of all, the fold or ear can be fully contracted, thus exerting maximum holding pressure by the clamp without the danger of squeezing out some of the material of the hose into the gap between the leg portions of the fold. Secondly, since the bridging member can be made of extremely thin band steel, for example, with a thickness of about 0.2 mm, no sharp edges are formed thereby which might cause undue wear on the thin-walled hose. Furthermore, the bridging member made from band steel or other suitable material with a thickness of the order indicated above, substantially does not affect the inner diameter of the hose clamp. Additionally, since relatively thin band steel is used for the bridging member in accordance with the present invention, it is not necessary to make a separate bridging member for each size of hose clamp since the thin band steel will adapt itself to changes in the radius of curvature when used with different hose clamps and can be easily bent manually into the approximate correct configuration. Moreover, the bridging member can be made from a material different from that used for the clamps, for example, from less costly material and can be readily manufactured relatively inexpensively as well as easily installed without special skills or attention because even a somewhat asymmetric installation would be inconsequential.

Thus, the present invention effectively eliminates the disadvantages encountered heretofore and permits an adaptation of the hose clamps described in my prior art patents for use in particular with thin-walled hoses.

Even though steel is a preferred material for use with the bridging member 20, other suitable non-steel materials can also be used in connection therewith, for example, plastic materials of any suitable type such as synthetic resinous materials, non-ferrous metals, brass, aluminum, copper and the like While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A bridging member for a hose clamp which includes a circumferential band having a radially outwardly projecting fold, for bridging the gap formed between outwardly projecting legs of the fold, characterized in that the bridging member includes a main surface portion of generally curved configuration and a width approximately equal to the width of the band of the hose clamp with which it is to be used, continuous side wall portions extending approximately at right angle from the main surface portion in a radially outward direction with respect to the center of the radius of curvature of the main surface portion, and means in the side walls formed by small inwardly projecting lug portions near a respective outer end of the side wall portions to enable snap-in assembly over the band of the hose clamp.

2. The combination according to claim 1, characterized in that said lug portions are arranged near the circumferential ends of the side walls along the radially outer parts thereof.

3. The combination according to claim 2 characterized in that the bridging member is made from a material having a thickness of the order of about 0.2 millimeters.

4. The combination according to claim 3 characterized in that said material is steel.

5. The combination according to claim 1, characterized in that the bridging member is made from a material having a thickness of the order of about 0.2 millimeters.

6. The combination according to claim 5 characterized in that said material is steel.

7. The combination according to claim 5 characterized in that said main surface portion is provided with a substantially circumferentially extending stiffening groove means.

8. The combination according to claim 7 wherein said substantially circumferentially extending groove means is pressed inwardly from said main surface portion.

9. The combination according to claim 1, characterized in that said main surface portion is provided with a substantially circumferentially extending reinforcing groove means.

10. The combination according to claim 9 characterized in that said circumferentially extending groove means is pressed out inwardly from said main surface portion.

11. The combination according to claim 1, characterized in that the bridging member is made from a material selected from the group consisting of non-ferrous metals, plastic materials, brass, aluminum, copper and steel.

12. The combination according to claim 1, characterized in that the thickness of the material of the bridging member is considerably smaller than the thickness of the circumferential band of the clamp.

13. A hose clamp assembly especially for relatively thin-walled hoses, comprising a circumferentially extending band portion provided with outwardly extending fold means, said fold means including outwardly extending leg portions passing over into the band circumferential portion and interconnected at the outer end by a web portion, said band portion having a predetermined width in the axial direction of the clamp, and said leg portions defining a gap in the circumferential direction of the band portion, and bridging means for said gap formed of thinwalled material and having a main surface portion of a width substantially equal to said predetermined width and a configuration generally conforming to the configuration of the band portion, said main surface portion abutting against the inner surface of the band portion within the area thereof on both sides of the gap to thereby bridge said gap, said main surface portion being adjoined by approximately parallel side wall portions disposed approximately at right angle to the main surface portion and provided with inwardly projecting lug means to snap-in behind the radially outer surface of the band portion so as to hold the bridging means firmly assembled to the band portion, and the thickness of the thin-walled material of said bridging means being substantially smaller than the thickness of the material used for the circumferentially extending band, said side wall portions extending continuously substantially over the same arcuate length as said main surface portion and wherein said lug means are provided near the respective outer ends.

14. The combination according to claim 13, characterized in that the base portion is provided with a circumferentially arranged reinforcing groove in the central area thereof.

15. The combination according to claim 14 wherein said circumferentially arranged reinforced groove is pressed out inwardly from said base portion.

16. The combination according to claim 13 characterized in that said bridging means is made from band steel having a thickness of the order of 0.2 millimeters.

17. The combination according to claim 13 characterized in that the bridging means is made from a less costly material than the material used for the band portion of the hose clamp.

18. The combination according to claim 17, characterized in that the material of said bridging means is considerably thinner than the material of the clamp band portion so that the bridging means can be bent manually to conform to the curvature of hose clamps of different sizes.

19. The combination according to claim 18 characterized in that said bridging means is made from band steel having a thickness of the order of 0.2 millimeters.

20. The combination according to claim 18 characterized in that the main surface portion is provided with a circumferentially arranged stiffening groove in the central area thereof.

21. The combination according to claim 13 characterized in that said bridging means is made from a material selected from the group consisting of non-ferrous metals, plastic materials, brass, aluminum, copper and steel.

* * * * *